United States Patent
Kwon et al.

(10) Patent No.: US 11,095,939 B2
(45) Date of Patent: Aug. 17, 2021

(54) IMAGE DISPLAY DEVICE AND SYSTEM THEREOF

(71) Applicant: LG ELECTRONICS INC., Seoul (KR)

(72) Inventors: Jeonghwan Kwon, Seoul (KR); Sunho Hwang, Seoul (KR); Kyungnam Bae, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/327,762

(22) PCT Filed: Sep. 7, 2016

(86) PCT No.: PCT/KR2016/010009
§ 371 (c)(1),
(2) Date: Feb. 22, 2019

(87) PCT Pub. No.: WO2018/047989
PCT Pub. Date: Mar. 15, 2018

(65) Prior Publication Data
US 2019/0238939 A1    Aug. 1, 2019

(51) Int. Cl.
*H04N 21/4402* (2011.01)
*H04N 21/442* (2011.01)
(Continued)

(52) U.S. Cl.
CPC .. *H04N 21/440263* (2013.01); *H04N 21/4126* (2013.01); *H04N 21/44209* (2013.01);
(Continued)

(58) Field of Classification Search
CPC ............................................. H04N 21/440263
See application file for complete search history.

(56) References Cited

U.S. PATENT DOCUMENTS

| | | | |
|---|---|---|---|
| 8,250,228 B1* | 8/2012 | Johansson | G06F 9/46 709/231 |
| 2006/0025149 A1* | 2/2006 | Karaoguz | H04N 21/4126 455/452.2 |

(Continued)

FOREIGN PATENT DOCUMENTS

| KR | 1020070018199 | 2/2007 |
|---|---|---|
| KR | 20160039453 | 4/2016 |

OTHER PUBLICATIONS

PCT International Application No. PCT/KR2016/010009, International Search Report dated May 23, 2017, 3 pages.
(Continued)

*Primary Examiner* — Junior O Mendoza
(74) *Attorney, Agent, or Firm* — Lee Hong Degerman Kang & Waimey

(57) ABSTRACT

An image display device includes: a wireless communication unit configured to communicate with a source device; and a controller configured to control the wireless communication unit to receive an image transmitted from the source device, wherein a resolution of the image transmitted from the source device is determined based on a channel condition of the wireless communication unit, and wherein the controller controls the channel condition of the wireless communication unit, such that the image transmitted from the source device has a specific resolution.

16 Claims, 14 Drawing Sheets

(51) Int. Cl.
*H04N 21/41* (2011.01)
*H04N 21/61* (2011.01)
*H04N 21/258* (2011.01)

(52) U.S. Cl.
CPC ..... *H04N 21/6125* (2013.01); *H04N 21/6131* (2013.01); *H04N 21/258* (2013.01)

(56) References Cited

U.S. PATENT DOCUMENTS

| | | | |
|---|---|---|---|
| 2007/0249363 A1* | 10/2007 | Amalfitano | H04W 72/1231 |
| | | | 455/453 |
| 2008/0195664 A1* | 8/2008 | Maharajh | G06Q 10/10 |
| 2010/0034256 A1 | 2/2010 | Bennett | |
| 2012/0147799 A1 | 6/2012 | Nagara et al. | |
| 2012/0163188 A1 | 6/2012 | Kobayashi | |
| 2013/0033435 A1 | 2/2013 | Raveendran et al. | |
| 2013/0076908 A1* | 3/2013 | Bratton | H04N 5/232 |
| | | | 348/159 |
| 2014/0184723 A1* | 7/2014 | Morrison | H04N 7/147 |
| | | | 348/14.07 |
| 2015/0016500 A1 | 1/2015 | Seregin et al. | |
| 2015/0121226 A1* | 4/2015 | Steiner | H04L 65/80 |
| | | | 715/722 |
| 2015/0206269 A1* | 7/2015 | Qin | H04N 21/42653 |
| | | | 715/202 |
| 2015/0213839 A1* | 7/2015 | Woodman | G11B 27/005 |
| | | | 386/248 |
| 2016/0066215 A1 | 3/2016 | Yang et al. | |
| 2017/0353705 A1* | 12/2017 | Rivera | G11B 27/102 |

OTHER PUBLICATIONS

Wi-Fi Alliance, "Wi-Fi Display Technical Specification Version 1.1", Apr. 24, 2014, 151 pages.
Wi-Fi Alliance, et al., "Wi-Fi Display Technical Specification Version 1.0.0", Aug. 24, 2012, 149 pages.
Korean Intellectual Property Office Application Serial No. 10-2019-7000991, Office Action dated Dec. 26, 2019, 5 pages.

* cited by examiner

IMAGE DISPLAY DEVICE AND SYSTEM THEREOF

CROSS-REFERENCE TO RELATED APPLICATIONS

This application is the National Stage filing under 35 U.S.C. 371 of International Application No. PCT/KR2016/010009, filed on Sep. 7, 2016, the contents of which are hereby incorporated by reference herein in its entirety.

TECHNICAL FIELD

The present invention relates to an image display device capable of transceiving an image, and a system thereof.

BACKGROUND ART

In the conventional art, image display devices are configured to receive broadcasting signals from a broadcasting station, to convert the broadcasting signals into an image, and to output the image. With development of communication techniques, the image display devices are configured to output not only broadcasting signals, but also images received via the Internet. Such an image display device configured to provide various functions via the Internet is called a smart TV.

The smart TV may provide various multimedia functions such as web access, a social network service (SNS) function and games, via communication.

Recently, image display devices are being developed with techniques for communicating with an external device such as a mobile terminal, and for outputting images received from the external device. For instance, the techniques include a mirroring technique, a digital living network alliance (DLNA) technique, a casting technique, etc.

For smooth communication between the image display device and an external device, the telecommunications standards institute has standardized communication techniques. As an example of standards, a Wi-Fi display specification v1.0 has been published on Aug. 24, 2012, and a standard document of Wi-Fi display specification v1.1 has been published on Apr. 24, 2014.

When an image display device and an external device share an image, a problem such as discontinuity of the image may occur due to an unstable communication state or a communication load.

DISCLOSURE

Technical Problem

Therefore, an object of the present invention is to provide a method of smoothly sharing an image between two devices.

Another object of the present invention is to provide a method of solving a problem such as discontinuity of an image when two devices share the image.

Another object of the present invention is to provide a method of changing a resolution of an image by an image receiving device, in a case where two devices according to standards share an image.

Another object of the present invention is to provide a method of enhancing efficiency of a memory when an image display device is in a multi-tasking state.

Technical Solution

To achieve these and other advantages and in accordance with the purpose of the present invention, as embodied and broadly described herein, there is provided an image display device, including: a wireless communication unit configured to communicate with a source device; and a controller configured to control the wireless communication unit to receive an image transmitted from the source device, wherein a resolution of the image transmitted from the source device is determined based on a channel condition of the wireless communication unit, and wherein the controller controls the channel condition of the wireless communication unit, such that the image transmitted from the source device has a specific resolution.

In an embodiment, the image display device may further include a display unit configured to real-time display the image transmitted from the source device. And the controller may control the channel condition of the wireless communication unit based on a size of an image displayed on the display unit, such that the image has a resolution corresponding to the size of the image.

In an embodiment, when the image displayed on the display unit has a first size, the controller may control the wireless communication unit to have a first bandwidth. And when the image displayed on the display unit has a second size larger than the first size, the controller may control the wireless communication unit to have a second bandwidth greater than the first bandwidth.

In an embodiment, when the size of the image displayed on the display unit is reduced to a value less than a preset size, the controller may restrict reception of the image being received through the wireless communication unit.

In an embodiment, when the size of the image displayed on the display unit is increased to a value more than the preset size, in the restricted state of the reception of the image, the controller may receive the image again.

In an embodiment, when an image display function for displaying the image transmitted from the source device is executed as a foreground job, the controller may control the wireless communication unit to have a first channel condition. And when the image display function is executed as a background job, the controller may control the wireless communication unit to have a second channel condition different from the first channel condition.

In an embodiment, the image transmitted from the source device may have a lower resolution when the image display function is executed as a background job, than when the image display function is executed as a foreground job.

In an embodiment, if the image display device being operated in a single-tasking state is converted to a multi-tasking state, the controller may control the channel condition of the wireless communication unit, such that an image to be received in the multi-tasking state may have a lower resolution than an image received in the single-tasking state.

In an embodiment, if the image display device being operated in a multi-tasking state is converted to a single-tasking state, the controller may control the channel condition of the wireless communication unit, such that an image to be received in the single-tasking state may have a higher resolution than an image received in the multi-tasking state.

In an embodiment, the controller may change a modulation type and a coding rate of the wireless communication unit, such that the channel condition of the wireless communication unit may be changed.

In an embodiment, when the channel condition of the wireless communication unit is changed, the controller may receive an image having a different resolution from the image received from the source device before the channel condition of the wireless communication unit is changed.

In an embodiment, the controller may output notification information indicating a need to change of the channel condition of the wireless communication unit, before controlling the channel condition of the wireless communication unit.

In an embodiment, the controller may control the channel condition of the wireless communication unit, based on a control command with respect to the notification information.

According to another aspect of the present invention, there is provided an image display device, including: a wireless communication unit configured to communicate with a sink device; and a controller configured to determine a specific resolution of an image to be transmitted to the sink device based on a channel condition of the sink device, and configured to transmit the image having the determined specific resolution to the sink device, wherein when the channel condition of the sink device is changed, the controller transmits an image having a resolution different from the specific resolution, to the sink device, based on the changed channel condition.

In an embodiment, the controller may sense the channel condition of the sink device while the image is being transmitted to the sink device.

In an embodiment, if a communication connection with the sink device is released, the controller may stop the transmission of the image to the sink device, and may store therein transmission history information indicating the stopped state of the transmission.

In an embodiment, when re-connected to the sink device for communication in the released state of the communication connection, the controller may transmit an image transmitted before the communication is stopped, to the sink device, based on the transmission history information.

Advantageous Effects

The image display device according to the present invention may have the following advantages.

Firstly, as a channel condition of the wireless communication unit is changed while an image is being received from the source device, an image having a different resolution from the image being received from the source device may be received. Thus, the image display device receives an image of a low resolution when a high resolution is not required, thereby minimizing discontinuity of images.

Secondly, the image display device may induce the source device to transmit an image having a changed resolution, even if it does not directly transmit a resolution change command to the source device.

Thirdly, if the image display device is in a multi-tasking state while an image received from the source device is being displayed, a channel condition of the wireless communication unit is changed such that the image received from the source device has a lowered resolution. With such a configuration, when the image display device is in a multi-tasking state, an unnecessary usage amount of the memory may be reduced to enhance efficiency of the memory.

MODE FOR INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

An image display device according to the present invention, which has an output unit configured to output an image in visual, audible and tactile manners, may include a stationary terminal and a mobile terminal.

For instance, the image display device may be a stationary terminal such as a digital TV, a desktop computer and a digital signage. And the image display device may be a mobile terminal including a cellular phone, a smart phone, a laptop computer, a digital broadcast terminal, a personal digital assistant (PDA), a portable multimedia player (PMP), a navigator, a slate PC, a tablet PC, an ultra book, a wearable device (for example, a smart watch, a smart glass, a head mounted display (HMD)), and the like.

Figure 1:
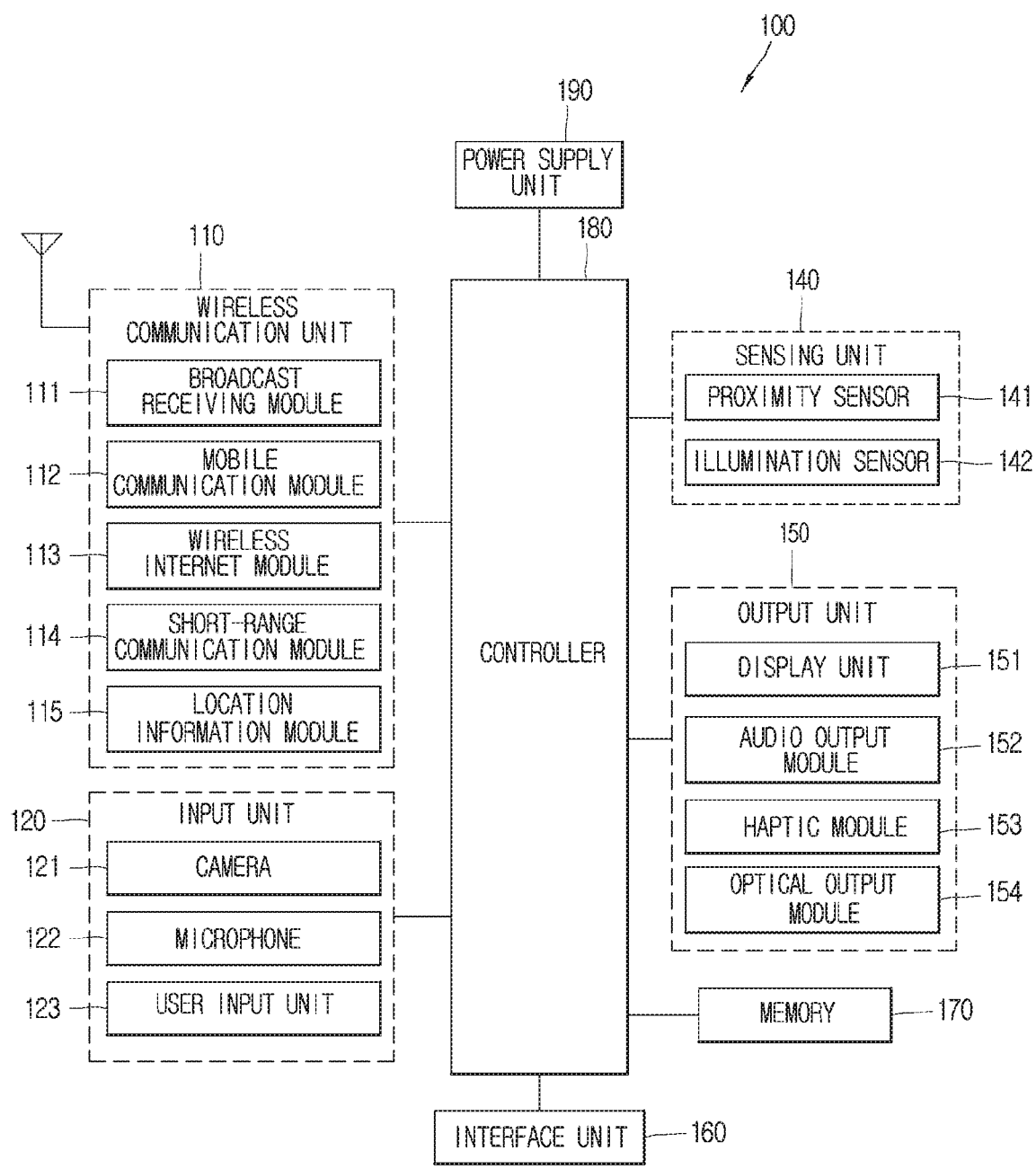
FIG. 1 is a block diagram illustrating an image display device according to the present invention.

FIG. 1 is a block diagram illustrating an image display device according to the present invention.

The image display device 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the image display device 100 and a wireless communication system, communications between the image display device 100 and another image display device, communications between the image display device 100 and an external server. Further, the wireless communication unit 110 typically includes one or more modules which connect the image display device 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, and the like) for allowing a user to input information. Data (for example, audio, video, image, and the like) is obtained by the input unit 120 and may be analyzed and processed by controller 180 according to user commands.

The sensing unit 140 is typically implemented using one or more sensors configured to sense internal information of the image display device, the surrounding environment of the image display device, user information, and the like. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The image display device 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the image display device 100 and a user, as well as function as the user input unit 123 which provides an input interface between the image display device 100 and the user.

The interface unit 160 serves as an interface with various types of external devices that can be coupled to the image display device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the image display device 100 may perform assorted control functions associated with a connected external device, in response to the external device being connected to the interface unit 160.

The memory 170 is typically implemented to store data to support various functions or features of the image display device 100. For instance, the memory 170 may be configured to store application programs executed in the image display device 100, data or instructions for operations of the image display device 100, and the like. Some of these application programs may be downloaded from an external server via wireless communication. Other application programs may be installed within the image display device 100 at time of manufacturing or shipping, which is typically the case for basic functions of the image display device 100 (for example, receiving a call, placing a call, receiving a message, sending a message, and the like). It is common for application programs to be stored in the memory 170, installed in the image display device 100, and executed by the controller 180 to perform an operation (or function) for the image display device 100.

The controller 180 typically functions to control overall operation of the image display device 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The controller 180 may encode/decode image data into a suitable form, for transception (transmission and reception) of data between image display devices. And the controller 180 may transmit the encoded/decoded image data to another image display device, or receive the encoded/decoded image data from another image display device.

The power supply unit 190 can be configured to receive external power or provide internal power in order to supply appropriate power required for operating elements and components included in the image display device 100. The power supply unit 190 may include a battery, and the battery may be configured to be embedded in the terminal body, or configured to be detachable from the terminal body.

At least some of the components may operate in cooperation with one another in order to implement an operation, control or control method of the image display device according to various exemplary embodiments to be described below. The operation, control or control method of the image display device may be implemented on the image display device by the execution of at least one application program stored in the memory 170.

Hereinafter, the wireless communication unit of the image display device which includes at least one of the aforementioned components according to the present invention will be explained.

Figure 2:
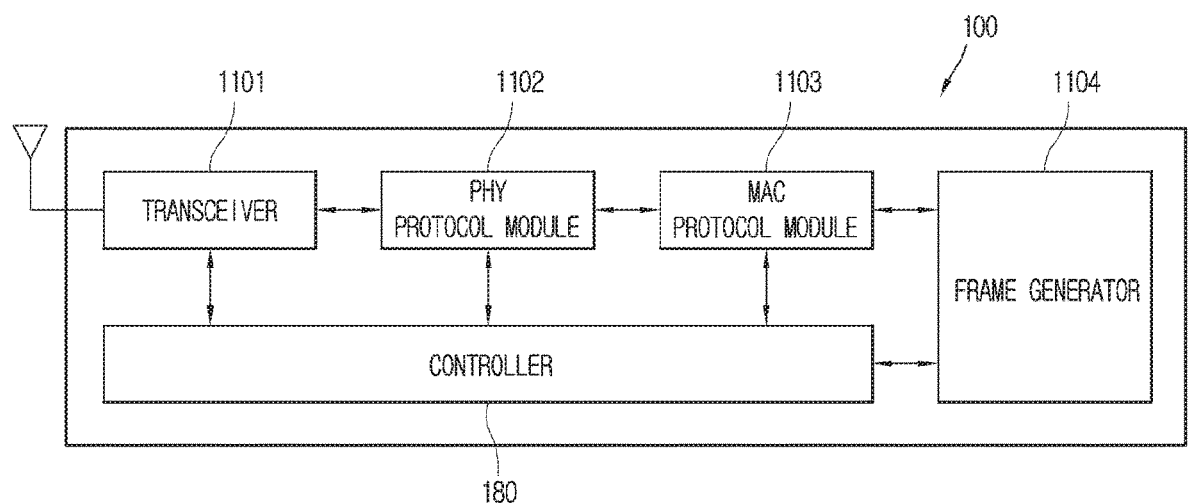
FIG. 2 is a block diagram illustrating a wireless communication unit of the image display device according to the present invention.

FIG. 2 is a block diagram illustrating the wireless communication unit for communication between the image display devices according to the present invention.

The image display device according to the present invention may execute communication between devices. Such an image display device may be a Wi-Fi device.

The Wi-Fi device means a device which can directly communicate with another device which uses a Wi-Fi network, without an access point (AP). Such a direct communication method between the Wi-Fi devices is called a wireless fidelity (Wi-Fi) direct method.

The Wi-Fi direct has standards defined by a standards organization. The following image display device means a device which executes communication according to standards of the Wi-Fi direct.

Referring to FIG. 2, the wireless communication unit 110 of the image display device 100 may include a transceiver (transmitter/receiver) 1101, a physical layer (PHY) protocol module 1102, a medium access control (MAC) protocol module 1103, a frame generation unit and the controller 180, in order to directly communicate with other image display device via a Wi-Fi network.

The transceiver 1101 transceives data with other Wi-Fi device via a Wi-Fi network. Once the transceiver 1101 receives information generated from the PHY protocol module 1102, the transceiver 1101 may transfer the received information to a radio frequency (RF) spectrum, and may transmit the information to an antenna after a filtering process, an amplification process, etc.

Further, the transceiver 1101 may receive an RF signal including an audio stream and/or a video stream from other Wi-Fi device, via a Wi-Fi network. The transceiver 1101 transfers an RF signal received from the antenna, to a band which can be processed in the PHY protocol module 1102, and filters the RF signal. And the transceiver 1101 may execute a switch function for converting such transceiving and receiving functions to each other.

The PHY protocol module 1102 corresponds to a physical layer among network layers, and converts data into a signal suitable for a communication medium.

More specifically, once data transmission is requested from the MAC protocol module 1103, the PHY protocol module 1102 transmits requested data to the transceiver 1101, after inserting an additional signal to the requested data through processes of a forward error correction (FEC) encoding, a modulation, a preamble and a pilot.

Once a reception signal received by the transceiver 1101 is transferred to the PHY protocol module 1102, the PHY protocol module 1102 may transfer the reception signal to the MAC protocol module 1103 through a demodulation, an equalization, a forward error correction (FEC) decoding, and a process to check the additional signal by a physical layer (PHY layer).

For such a function, the PHY protocol module 1102 may include a modulator, a demodulator, an equalizer, a forward error correction (FEC) encoder, and a forward error correction (FEC) decoder.

The MAC protocol module 1103 may execute a process required to transfer data received from an upper layer to the PHY protocol module 1102 in a network layer, and may execute an additional transmission for basic communication.

For this, the MAC protocol module 1103 may process data requested to be transmitted by an upper layer, so as to be suitable for transmission, and then may transfer the processed data to the PHY protocol module 1102. The MAC protocol module 1103 processes reception data transferred from the PHY protocol module 1102, and then transfers the processed data to an upper layer. And the MAC protocol module 1103 executes an additional transception required for such a data transfer, thereby processing communication protocols.

The frame generator 1104 generates a data frame, a request frame and/or a response frame, for communication with other Wi-Fi device.

The controller 180 controls at least one of the aforementioned components, thereby executing communication between the image display devices 100.

So far, has been explained the wireless communication unit for communication between the image display devices 100 according to the present invention.

Hereinafter, will be explained components for data transception between the image display devices.

Figure 3:
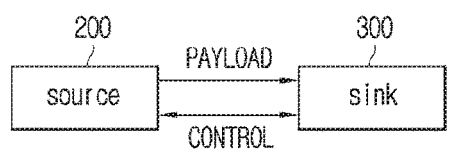
FIG. 3 is a block diagram illustrating a source device and a sink device according to the present invention.

FIG. 3 is a block diagram illustrating a source device and a sink device according to the present invention.

The image display device of the present invention may include a source device 200 for transmitting image data, and a sink device 300 for receiving image data. The image data includes audio data and video data.

More specifically, the source device 200 means an image display device for transmitting image data to the sink device 300 via a Wi-Fi network. And the sink device 300 means an image display device for receiving image data from the source device 200 via a Wi-Fi network.

Hereinafter, the terms of the source device 200 and the sink device 300 will be used when the source device 200 and the sink device 300 are distinguished from each other. However, the term of the image display device will be used when the image display device is applied to all of the source device 200 and the sink device 300.

Referring to FIG. 3, the source device 200 and the sink device 300 may be paired with each other for communication. Here, the pairing may mean a state where the source device 200 and the sink device 300 transceive (transmit and receive) data with each other. An operation for such a pairing may be implemented by the conventional method, and detailed explanations thereof will be omitted.

In case of pairing the source device 200 and the sink device 300 with each other, controllers of the device 200 and the sink device 300 may transceive information related to data transception with each other. Here, the information related to data transception may be a message for determining a format of audio data and/or video data, etc. The information related to data transception may be included in RTSP command messages.

After a format of audio data and/or video data is determined based on the information related to data transception, the source device 200 may transmit image data to the sink device 300.

The source device 200 may include a video codec, an audio codec, a PES packetization, an HDCP system 2.0/2.1, and an MPEC2-TS over RTP/UDP/IP, in order to generate an audio/video stream.

The source device 200 may be composed of an RTSP over TCP/IP, a remote I2C Read/Write, a UIBC with HIDC, a generic user input, and a session key establishment, in order to transmit an audio/video stream to the sink device 300.

As shown in FIG. 3, the source device 200 may be operated based on an RTP or a UDP in order to real-time transmit an audio/video stream, and may be operated based on a TCP in order to control communication. That is, an image data transmission channel not requiring error restoration, and an information transmission channel for communication control may be implemented in different manners.

The sink device 300 may real-time receive an audio/video stream from the source device 200. And the sink device 300 may execute a decoding and a rendering with respect to the real-time received audio/video stream, and may output the audio/video stream to the display unit.

So far, has been explained a method of transceiving image data between the source device and the sink device.

Hereinafter, will be explained a connection method between the image display devices according to the present invention.

Figure 4A:
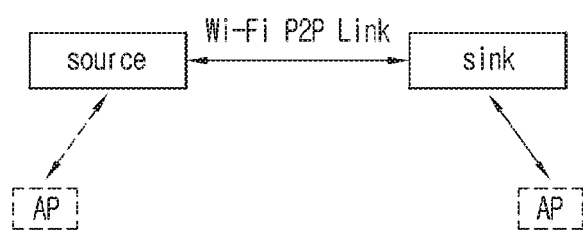
FIGS. 4A and 4B are conceptual views illustrating a connection method between image display devices according to the present invention.
Figure 4B:
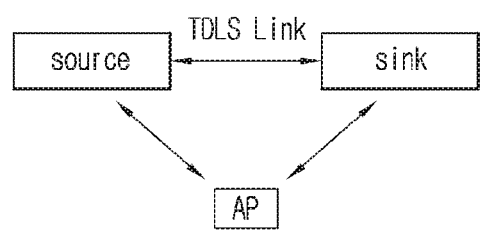

FIGS. 4A and 4B are conceptual views illustrating a connection method between the image display devices according to the present invention.

The image display devices according to the present invention, i.e., the source device 200 and the sink device 300 may be connected to each other by a Wi-Fi P2P link or a TDLS link.

As shown in FIG. 4A, the source device 200 and the sink device 300 may be connected to each other by a Wi-Fi P2P link according to standards of 802.11 Wi-Fi P2P. In this case, an access point (AP) may be connected to each of the source device 200 and the sink device 300. The AP may be the same AP, or may be different APs. Alternatively, an access point (AP) may not be connected to the source device 200 and the sink device 300.

As shown in FIG. 4B, the source device 200 and the sink device 300 may be connected to each other by a TDLS link according to standards of 802.11 Tunneled Direct Link Setup (TDSL). In this case, the source device 200 and the sink device 300 may be connected to each other through a specific AP. That is, the source device 200 and the sink device 300 may share an AP.

So far, has been explained a connection method between the source device 200 and the sink device 300.

According to standards of Wi-Fi direct, when the source device transmits an image to the sink device, a resolution of an image to be transmitted to the sink device is determined based on performance of the sink device. Further, the standards of Wi-Fi direct regulate a method of changing a resolution of an image by the source device, while an image is being transmitted.

However, according to the standards, the sink device does not have a right to change a resolution of an image transmitted from the source device while an image is being transmitted. This may cause the sink device to always receive an image of a high resolution from the source device even when it is not required.

Hereinafter, will be explained a method of controlling a resolution of an image by the sink device for a smooth image sharing, when an image is transceived between the source device and the sink device.

Hereinafter, a controller of the sink device 300 will have a reference number of 380, and a display unit of the sink device 300 will have a reference number of 351. Likewise, a controller of the source device 200 will have a reference number of 280, and a display unit of the source device 200 will have a reference number of 251. The same components will be provided with the same reference numeral, and detailed explanations about the respective components will be replaced by the aforementioned explanations about the controller 180, the display unit 151 and the wireless communication unit 110 of FIG. 1.

Figure 5:
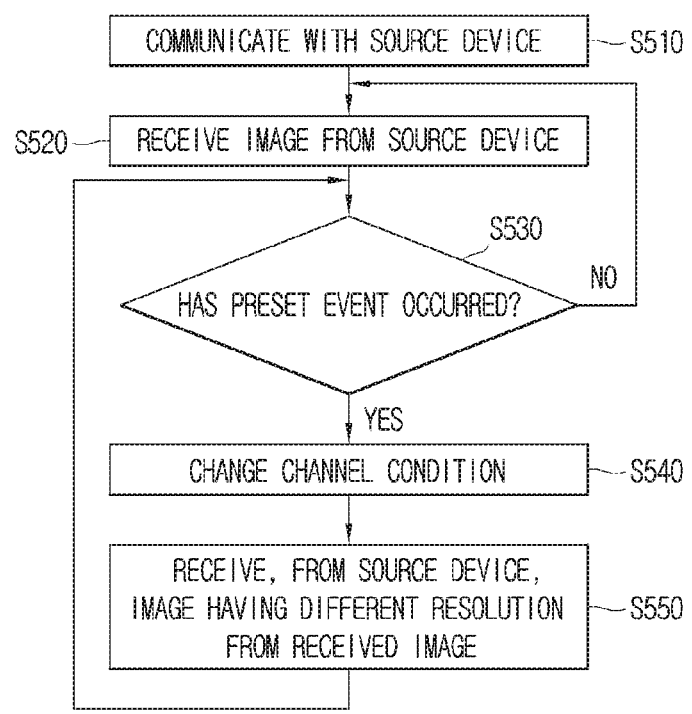
FIG. 5 is a flowchart illustrating a method of changing a resolution of an image received from a source device, by a sink device according to the present invention.
Figure 6:
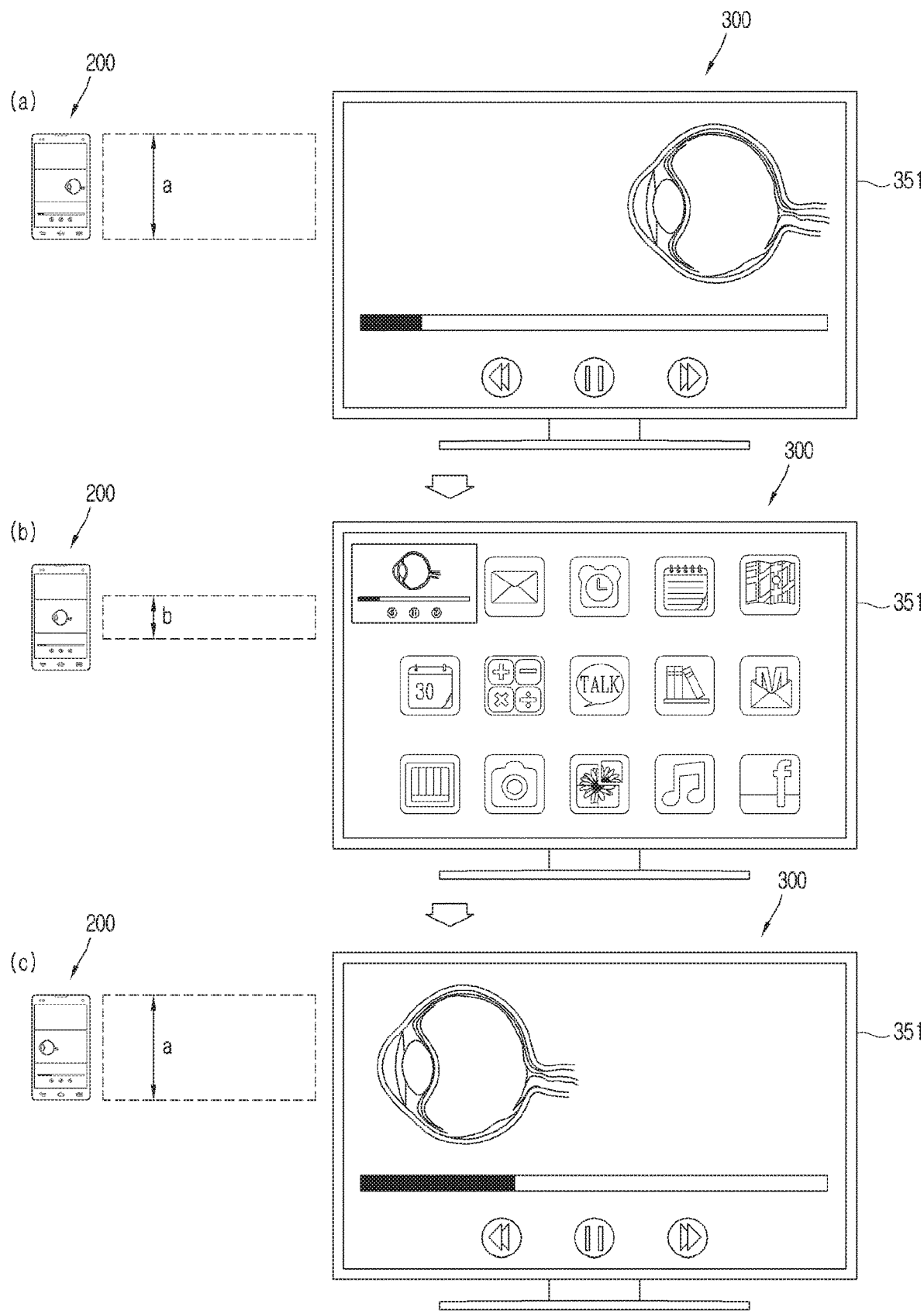
FIG. 6 is a conceptual view illustrating an embodiment related to FIG. 5.

FIG. 5 is a flowchart illustrating a method of changing a resolution of an image received from the source device, by the sink device according to the present invention. And FIG. 6 is a conceptual view illustrating an embodiment related to FIG. 5.

First of all, the sink device 300 may be connected to the source device 200 for communication (S510).

As aforementioned with reference to FIGS. 2, 3A and 3B, the sink device 300 may be paired with the source device 200. More specifically, the controller 380 of the sink device 300 may transmit information related to data transception (e.g., RTSP messages) to the source device 200. Then, the controller 380 may execute a pairing with the source device 200 based on the information related to data transception.

After being connected to the source device 200, the sink device 300 may receive an image from the source device 200 (S520).

The image may include a still image and a moving image. The moving image may include audio data and/or video data.

The source device 200 may determine a format of the image based on a channel condition. The channel condition means a state of a communication path (a communication channel) where image data is transferred, and may be defined based on communication-related information such as a bandwidth and a transmission speed. Hereinafter, the channel condition will be explained based on a bandwidth. However, the channel condition may be equally applied to a transmission speed, etc.

The format of the image may mean a format to determine a resolution of the image.

The resolution of the image may be divided into a standard definition (SD), a high definition (HD), a full high definition, an ultra high definition, etc. It is obvious to those skilled in the art that the resolution of the image may be divided in a more detailed manner.

The controller 280 of the source device 200 paired with the sink device 300 may determine a resolution of an image to be transmitted to the sink device 300, based on a bandwidth of the sink device 300. The controller 280 may set a resolution of an image to be transmitted to the sink device 300 as a higher resolution when a bandwidth becomes larger.

For instance, in case of a channel condition (a communication state) having a first bandwidth, the source device 200 may determine a resolution of an image as a first resolution corresponding to the first bandwidth. As another example, in case of a channel condition having a second bandwidth larger than the first bandwidth, the source device 200 may determine a resolution of an image as a second resolution corresponding to the second bandwidth. The second resolution may be higher than the first resolution.

After determining the resolution of the image, the controller 280 may real-time transmit the image to the sink device 300.

Once the image is received from the source device 200, the sink device 300 may output the received image to an output unit. More specifically, the controller 380 of the sink device 300 may execute a decoding and a rendering with respect to the image real-time received from the source device 200. Then, the controller 380 may output the image having undergone the decoding and the rendering, to the display unit 351. If the image is a video, the output of the image means play of the video.

The sink device 300 may sense occurrence of a preset event while the image is being received real time (S530).

The preset event may be an event related to an operation of the sink device 300 which requires a change of a resolution of the image received from the source device 200.

More specifically, the preset event may be one of an event that a display size of an image is changed, an event that an execution state of an image display function is changed, and an event that the sink device 300 is in a multi-tasking state.

The event that a display size of an image is changed means an event that a display size of an image on the display unit is changed. For instance, the display size may mean a proportion of an image display region with respect to an entire output region on the display unit.

The event that an execution state of an image display function is changed means an event that an image display function is changed to one of a background job and a foreground job. The image display function means a function to display the image received from the source device 200.

The background job means an operation to later process a program having a low priority while simultaneously processing a plurality of programs. In a state of the background job, the program does not have a right to access a screen. On the other hand, the foreground job means an operation to firstly process a program having a high priority while simultaneously processing a plurality of programs. In a state of the foreground job, the program may have a right to access a screen The event that the sink device 300 is in a multi-tasking state means a state where the sink device 300 simultaneously executes a plurality of programs. That is, the event that the sink device 300 is in a multi-tasking state may mean a state where the sink device 300 simultaneously executes other functions rather than an image output function. On the other hand, when the sink device 300 executes only an image output function, it may be understood that the sink device 300 is in a single-tasking state for a single program.

When a preset event occurs, the controller 380 of the sink device 300 may change a channel condition (S540).

Once the preset event occurs, the controller 380 may change the channel condition of the wireless communication unit in order to change a resolution of the image received from the source device 200.

More specifically, the controller 380 may change a bandwidth of a communication path where the sink device 300 communicates with the source device 200. In order to change the bandwidth of the communication path, the controller 380 may change a modulation type and a coding rate of a Wi-Fi driver.

For instance, as shown in FIG. 6(*a*), the source device 200 may transmit an image having a first resolution to the sink device 300, through a communication path having a first bandwidth. The controller 380 of the sink device 300 may display the image received from the source device 200, with a first size corresponding to an entire output region of the display unit 151.

In this case, the controller 380 of the sink device 300 may sense a change of a display size of the image being output to the display unit 151. For instance, as shown in FIG. 6(*b*), the image being output to the display unit 151 may be contracted to have a second size from the first size.

The display size of the image may be changed according to a user's control command or a preset condition. For instance, the controller 380 may change the display size of the image, based on a control command input through a user input unit. Alternatively, the controller 380 may change the display size of the image when a function unrelated to display of the image, among a plurality of functions installed at the image display device, is requested by input.

If the display size of the image is changed, the controller 380 may determine to change a resolution of the image received from the source device 200 to a low resolution corresponding to the second size, from a high resolution corresponding to the first size.

Accordingly, the controller 380 may change a bandwidth of a communication path where communication with the source device 200 is executed, such that the source device 200 may change a resolution of the image. For instance, as shown in FIG. 6(*b*), the controller 380 may change a bandwidth from a first bandwidth (a) to a second bandwidth (b) narrower than the first bandwidth (a).

While the image is being transmitted to the sink device 300, the controller 280 of the source device 200 may sense a change of a bandwidth of a communication path where communication with the sink device 300 is executed. In this case, the controller 280 of the source device 200 may change a resolution of the image being transmitted to the sink device 300, in correspondence to the changed bandwidth. For instance, if a decrease of the bandwidth is sensed while an image having a first resolution is being transmitted, the controller 280 may change a resolution of an image to be transmitted to the sink device 300, from the first resolution to a second resolution lower than the first resolution.

Then, the controller 280 of the source device 200 may transmit the image having the second resolution to the sink device 300.

After the bandwidth is changed, the sink device 300 may receive, from the source device 200, an image having a different resolution from the image received before the bandwidth is changed (S550).

In this case, as shown in FIG. 6(*b*), the controller 380 may output the image having the different resolution to the display unit 151.

That is, the controller 380 of the sink device 300 may induce the source device 200 to change a resolution of an image by changing a channel state. Thus, the sink device 300 may receive an image having a changed resolution from the source device 200, even if it does not directly transmit a control command for change of a resolution to the source device 200.

Although not shown, the controller 380 may sense that a display size of an image being output returns to the size before the bandwidth is changed. For instance, as shown in FIG. 6(*c*), the controller 380 may sense that a display size of an image being output to the display unit 151 has changed from the second size to the first size, the size before the bandwidth is changed.

In this case, the controller 380 may determine to change a resolution of the image in correspondence to the first size.

Accordingly, as the size of the image is changed to the first size, the controller 380 may change a bandwidth of a communication path where communication with the source device 200 is executed, into a bandwidth corresponding to the first size. More specifically, when an image has a size change to the first size from the second size, the controller 380 may change a bandwidth from the second bandwidth (b) corresponding to the second resolution, to the first bandwidth (a) corresponding to the first resolution.

That is, the sink device 300 may change a bandwidth according to a size of an image, such that the image may be received with a suitable resolution.

In this case, as aforementioned, the source device 200 may sense the change of the bandwidth from the second bandwidth (b) to the first bandwidth (a), and may transmit an image having the first resolution corresponding to the first bandwidth (a), to the sink device 300.

Thus, a user may be provided with an image having a proper resolution according to a display size of an image being output to the sink device 300, without applying an additional control command to change a resolution.

So far, has been explained a method of changing a resolution of an image by changing a bandwidth when the image is transceived between the source device 200 and the sink device 300. Thus, the sink device 300 may request the source device 200 to change a resolution of an image. With such a configuration, an image may be transceived more smoothly between the source device 200 and the sink device 300, and a problem such as discontinuity of the image may be minimized.

Hereinafter, will be explained a method of changing a resolution of an image according to a display size of the image, by the sink device.

Figure 7:
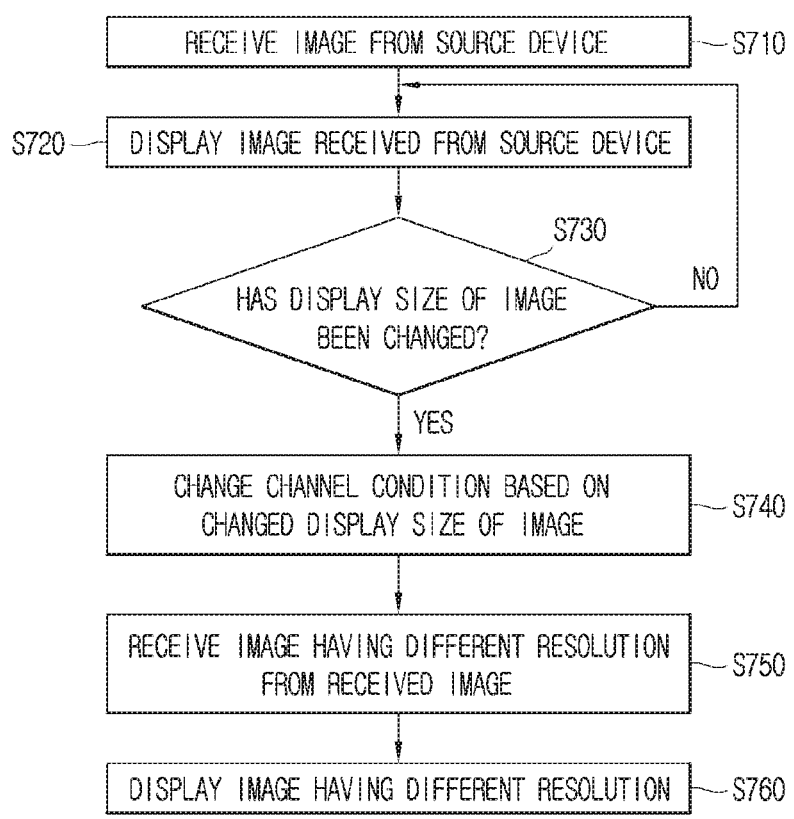
FIG. 7 is a flowchart illustrating a method of changing a resolution of an image according to a display size of the image, in the sink device according to the present invention.
Figure 8:
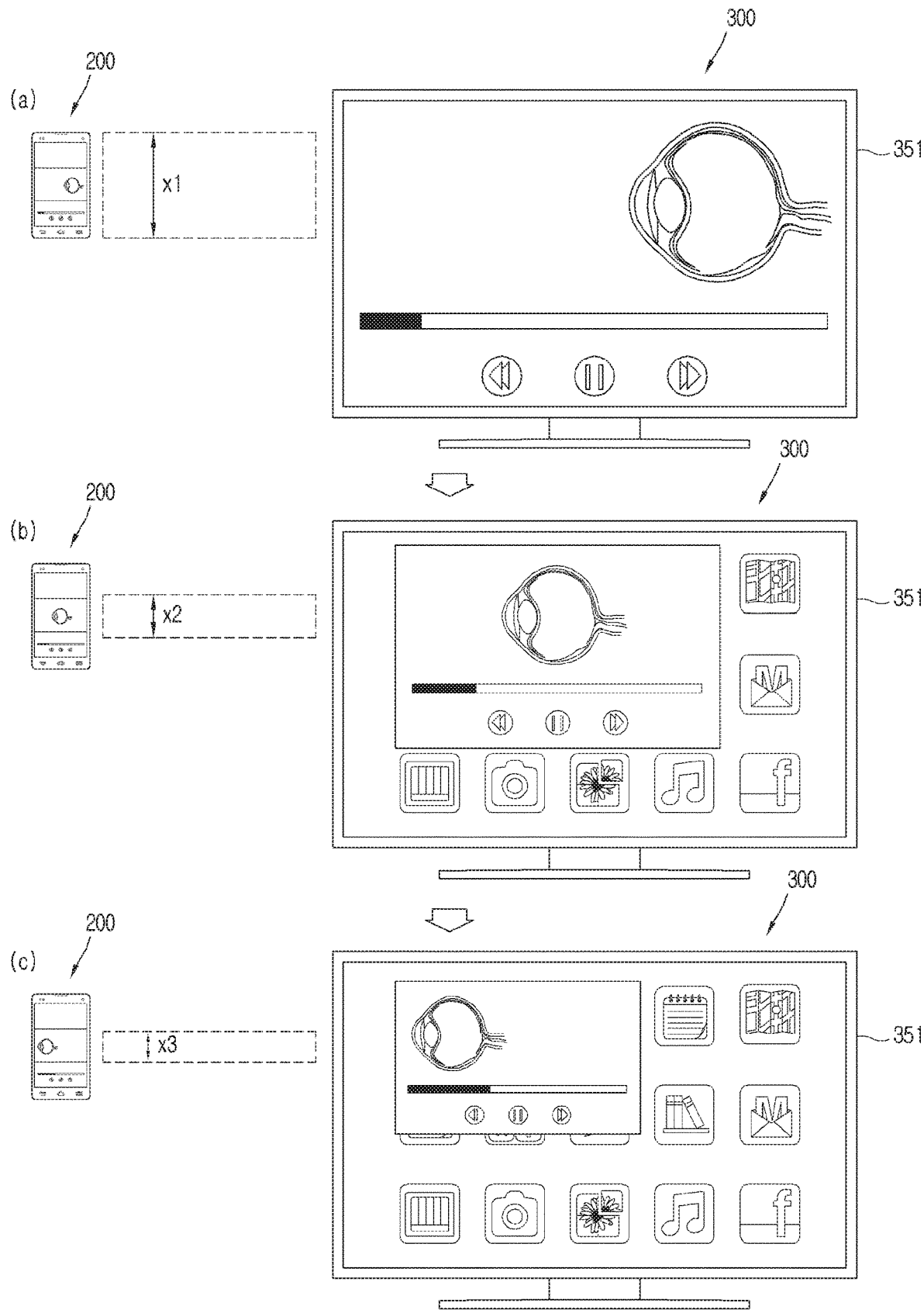
FIGS. 8 and 9 are conceptual views illustrating an embodiment related to FIG. 7.
Figure 9:
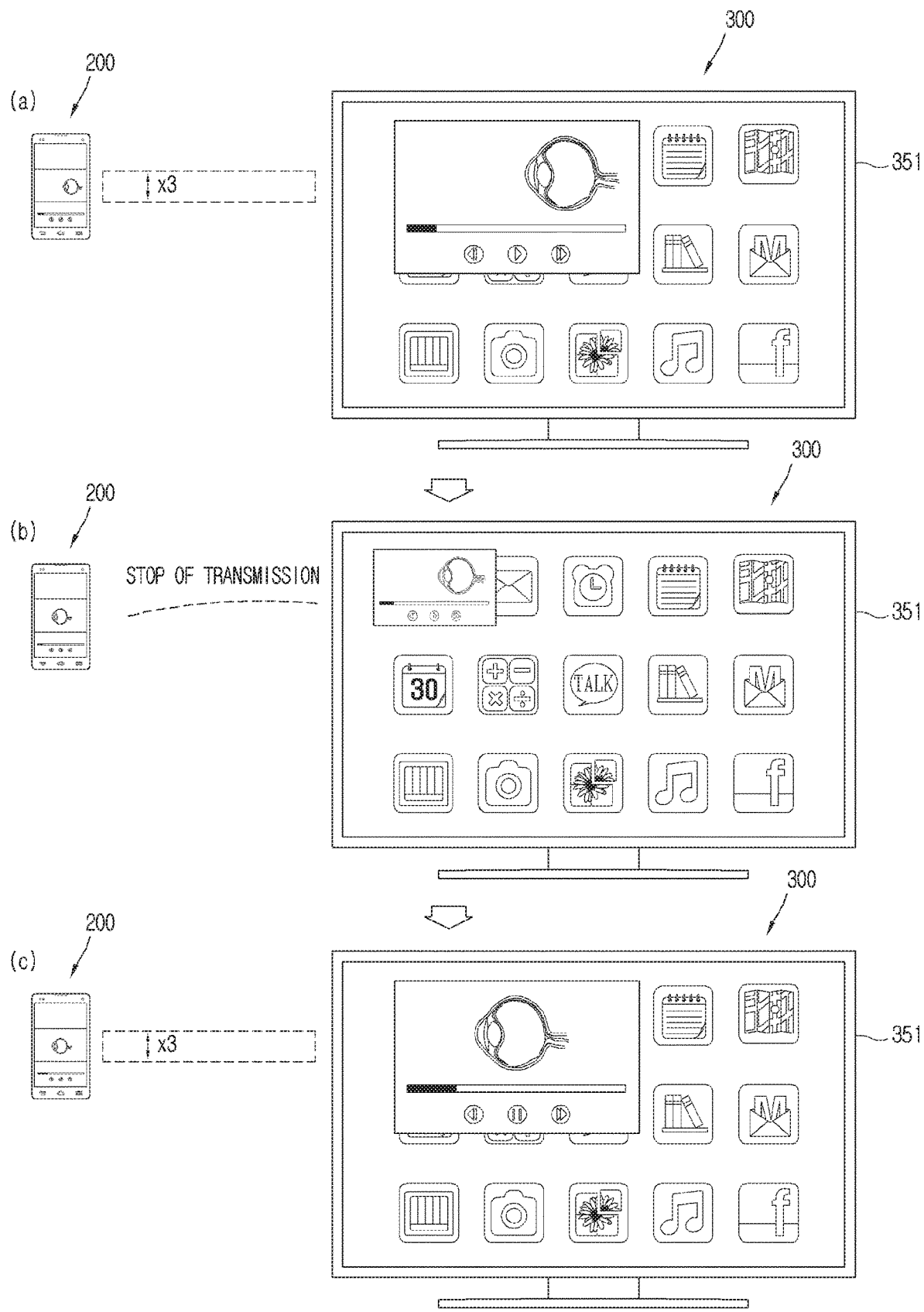

FIG. 7 is a flowchart illustrating a method of changing a resolution of an image according to a display size of the image, in the sink device according to the present invention, and FIGS. 8 and 9 are conceptual views illustrating the method of FIG. 7.

In the following descriptions, it is assumed that the source device 200 and the sink device 300 are paired with each other.

Referring to FIG. 7, the controller 380 of the sink device 300 may receive an image from the source device 200 (S710). Once the image is received from the source device 200, the controller 380 may display the image on the display unit 351 (S720).

Then, the controller 380 may sense a change of a display size of the image (S730).

The controller 380 may change the display size of the image according to a user's control command.

The user's control command may be input in various manners, e.g., by a wireless signal input using a remote controller such as a remote controller, a touch input, a gesture input, etc.

The user's control command may be a control command to change the display size of the image.

The controller 380 may display the image in one of an entire display mode for displaying the image on an entire output region on the display unit 351, and a partial display mode for displaying the image on a partial output region on the display unit 351.

The entire display mode or the partial display mode may be determined according to a user's control command.

For instance, as shown in FIG. 7(*a*), an image received from the source device 200 may be displayed on an entire output region on the display unit 351. In this case, it may be understood that the image display device has entered the entire display mode.

Once a control command to enter the partial display mode is input, the controller 380 may display the image on a part of the display unit 351, as shown in FIG. 7(*b*). In this case, it may be understood that the image display device has entered the partial display mode.

In the partial display mode, a user may determine a display size of an image. For instance, as shown in FIG. 7(*b*), in response to an input of a control command to display an image with a first size, the controller 380 may display the image with the first size. As shown in FIG. 7(*c*), in response to an input of a control command to display an image with a second size smaller than the first size, the controller 380 may display the image with the second size.

Once the display size of the image is changed, the controller 380 may change a channel condition based on the changed display size of the image (S740).

Once the change of the display size of the image is sensed, the controller 380 may determine to change a resolution of the image transmitted from the source device.

Thus, the controller 380 may change a bandwidth of a communication path where communication with the source device 200 is executed, in order to induce a change of a resolution of the image transmitted from the source device.

More specifically, when the display size of the image is reduced, the controller 380 may set the bandwidth to be reduced. On the contrary, when the display size of the image is increased, the controller 380 may set the bandwidth to be increased.

For instance, referring to FIGS. 8(*a*) to 8(*c*), the controller 380 may set a bandwidth to be reduced (x1? x2? x3), in proportion to a decrease of the display size of the image.

After the bandwidth of the communication path is changed, the controller 380 may receive an image having a different resolution from the image received before the bandwidth is changed (S750). Then, the controller 380 may display the image having the different resolution (S760).

For instance, referring to FIG. 8(*a*), the controller 380 receives an image having a first resolution in a first bandwidth (x1). In this case, the controller 380 may sense a size change of the image having the first resolution, from a first size to a second size. In this case, as shown in FIG. 8(*b*), the controller 380 may change the bandwidth (x1) of the communication path to a second bandwidth (x2).

Then, the controller 380 may receive an image having a second resolution different from the first resolution of the image received before the bandwidth is changed. Then, the controller 380 may display the image having the second resolution on the display unit 351, with the second size.

Likewise, as shown in FIG. 8(*c*), when the image has a size change to a third size from the second size, the controller 380 may change the bandwidth of the communication path to a third bandwidth (x3) from the second bandwidth (x2). In this case, the controller 380 may receive an image having a third resolution, and may output the image having the third resolution on the display unit 351 with the third size.

In the aforementioned descriptions, an image received from the source device may mean frames which constitute a video. That is, while a video is being played, the sink device may change a resolution of the video according to a size of the video, and may real-time display the video.

If the image received from the source device is reduced to a size less than a preset size, the controller 380 may restrict reception of next images.

For this, the controller 380 may release a communication connection with the source device 200, if the image received from the source device is reduced to a size less than a preset size. In this case, the controller 380 may not receive an image from the source device 200 any loner. The preset size may mean a size set by a user or the controller.

That is, if an image received from the source device is reduced to a size less than a preset size, the sink device 300 may determine that a user does not wish to view the image, and thereby may stop receiving next images. Thus, the sink device 300 of the present invention may check a user's needs, and may prevent reception of unnecessary images.

If a communication connection between the controller 380 and the source device 200 is released, the controller 380 may output an image lastly received before the communication connection is released, on the display unit 351. If a video is being received, the controller 380 may stop playing the video.

For instance, as shown in FIG. 9(*a*), while an image having a third resolution in a third bandwidth (x3) is being received, the controller 380 may sense a size decrease of the image to a size less than a preset size.

In this case, as shown in FIG. 9(*b*), the controller 380 may release the communication connection with the source device 200. And the controller 380 may stop playing the video.

As shown in FIG. 9(*c*), in the released state of the communication connection, the controller 380 may sense a size increase of the image to a size more than a preset size. In this case, the controller 380 may resume communication with the source device 200.

Here, the controller 380 may receive again the image which was being received before the communication connection is released. For this, the source device 200 may store information about a transmission history of the image which was being transmitted when the communication connection is released. Then, if the communication connection is executed again, the source device 200 may re-transmit the image which was being received before the communication connection is released, to the sink device 300, based on the information about a transmission history. Accordingly, even if the communication connection is released, the sink device 300 may maintain continuity of an image which was being received before the communication connection is released.

So far, has been explained a method of receiving an image having a resolution suitable for a display size of the image, by controlling a channel condition according to the display size of the image.

Hereinafter, will be explained a method of changing a resolution of an image according to a change of an execution state of an image display function.

Figure 10:
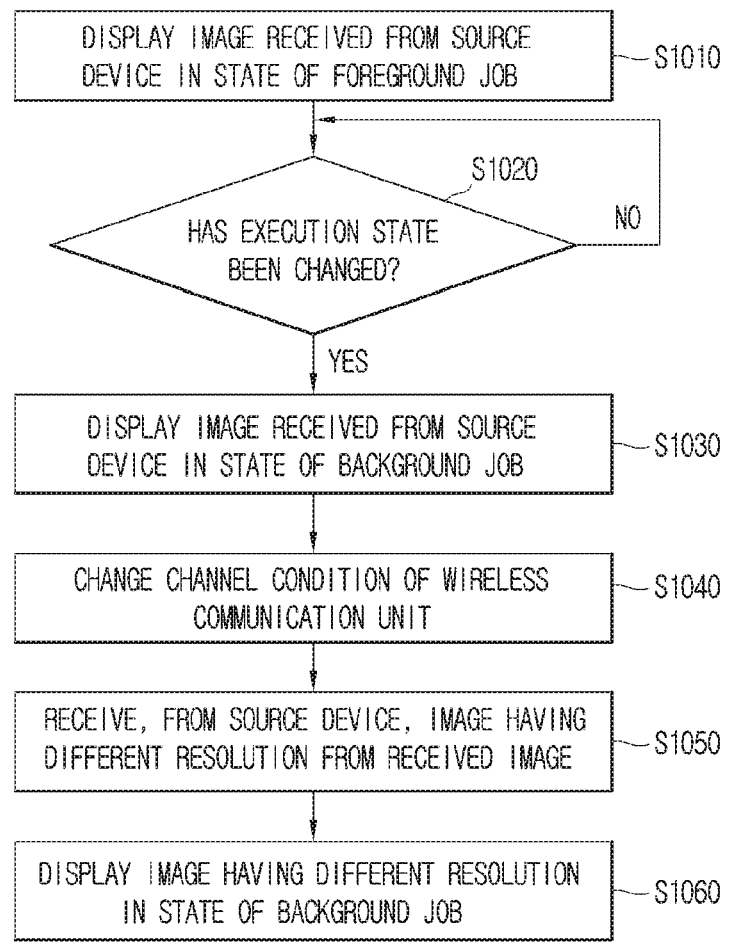
FIG. 10 is a flowchart illustrating a method of changing a resolution of an image according to an execution state of an image received from the source device, by the sink device according to the present invention.

FIG. 10 is a flowchart illustrating a method of changing a resolution of an image according to an execution state of an image received from the source device, by the sink device according to the present invention. And FIG. 11 is a conceptual view illustrating an embodiment related to FIG. 10.

The controller 380 of the sink device 300 may change a resolution of an image received from the source device 200, by changing a channel condition of a communication path where communication with the source device 200 is executed.

More specifically, referring to FIG. 10, the controller 380 may execute an image display function as a foreground job, in order to display an image received from the source device (S1010).

Figure 11:
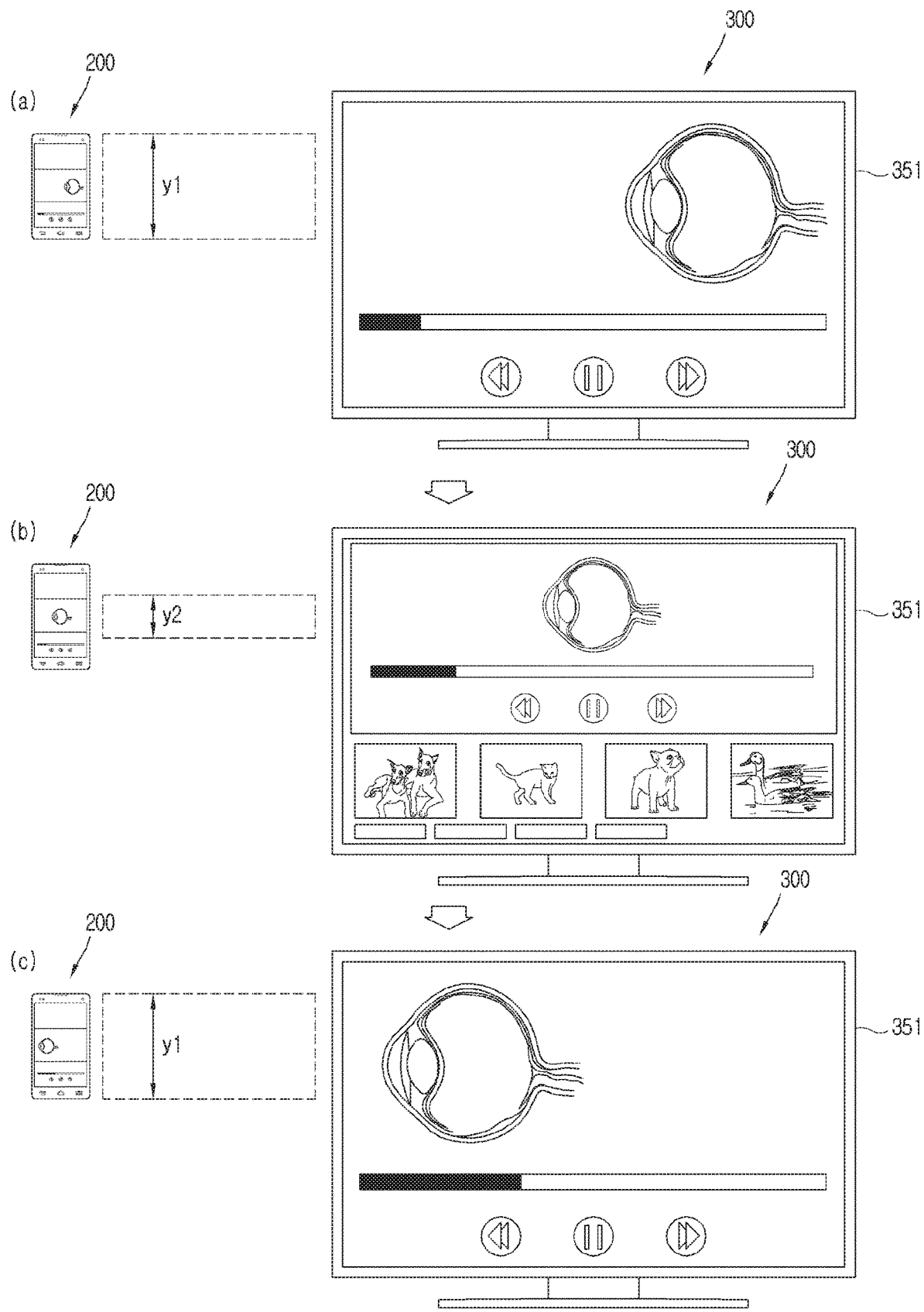
FIG. 11 is a conceptual view illustrating an embodiment related to FIG. 10.

As shown in FIG. 11(*a*), the controller 380 may display an image real-time received from the source device, on the display unit 351 when an image display function is executed as a foreground job.

When the image display function is executed as a foreground job, the controller 380 may set the communication path where communication with the source device 200 is executed, to have a bandwidth of a first size (y1).

While the image received from the source device is being displayed, the controller 380 may sense whether a preset event has occurred or not (S1020).

When the image display function to display the image received from the source device is executed as a foreground job, the controller 380 may sense an event to convert an execution state of the image display function into a background job.

The event to convert an execution state of the image display function into a background job may occur when other function rather than the image display function is requested. For instance, as shown in FIG. 11(*b*), if a menu display function is requested while the image display function is being executed, the controller 380 may execute the menu display function as a foreground job, and may execute the image display function as a background job. Here, the menu display function may be a function to display menus having various functions of the image display device as items.

As another example, although not shown, if the image display device enters a standby mode while an image display function is being executed, the controller 380 may execute the image display function as a background job. Here, the standby mode means an operation state where execution of a program is restricted as remaining currents except for a quiescent current are interrupted, because a user's input has not been applied for a predetermined time. In the standby mode, a screen saver may be output to the display unit to save power consumption.

In this case, the controller 380 may reduce a bandwidth of the communication path where communication with the source device 200 is executed. For instance, as shown in FIG. 11(*b*), if an image display function is being executed on a background, the controller 380 may change a bandwidth into a second bandwidth (y2) from a first bandwidth (y1). In this case, the source device 200 may change a resolution of an image to be transmitted to the sink device 300. For instance, if the bandwidth is changed into the second bandwidth (y2) from the first bandwidth (y1) while an image having a first resolution is being transmitted, the source device 200 may transmit an image having a second resolution lower than the first resolution, to the sink device 300.

The sink device 300 reduces a usage amount of the memory for communication by changing a bandwidth, thereby reducing an unnecessary usage amount of the memory and enhancing efficiency of the memory.

If the image display function is executed as a foreground job according to a user's request, the controller 380 may re-change the bandwidth of the communication path where communication with the source device 200 is executed.

For instance, once a user's request to execute the image display function as a foreground job is received, the controller 380 may control the image display function to be executed as a foreground job not a background job. In this case, the controller 380 may re-change the bandwidth to the first bandwidth (y1) from the second bandwidth (y2). With such a configuration, when an image display function is executed as a foreground job, a user may be provided with an image of a high resolution. On the other hand, when an image display function is executed as a background job, a user may be provided with an image of a low resolution.

So far, has been explained a method of changing a resolution of an image according to an execution state of an image display function.

Hereinafter, will be explained a method of changing a resolution of an image according to a multi-tasking state.

Figure 12:
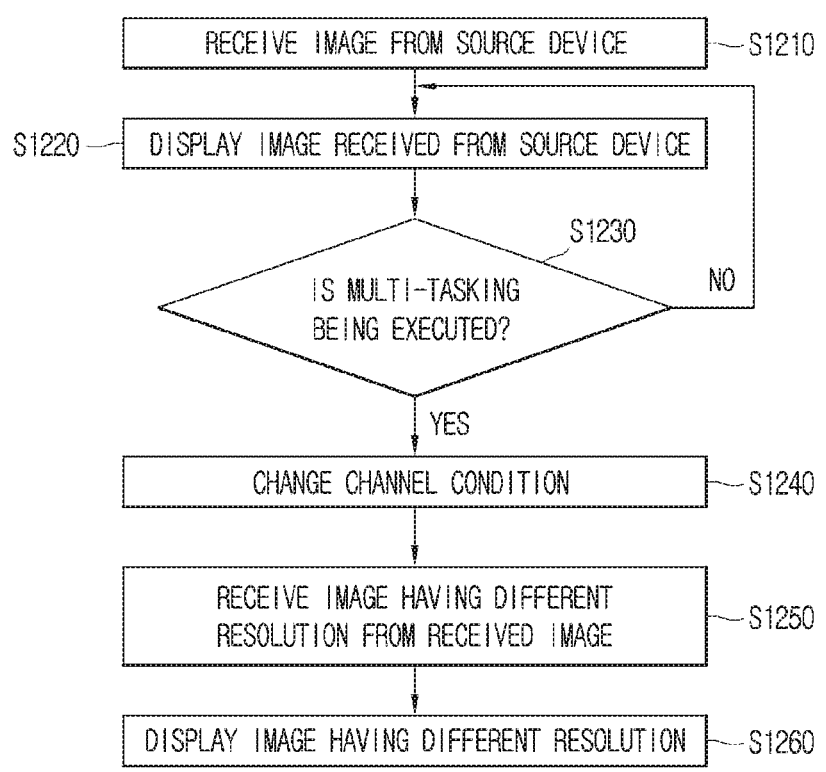
FIG. 12 is a flowchart illustrating a method of changing a resolution of an image according to a multi-tasking state, by the sink device according to the present invention.
Figure 13:
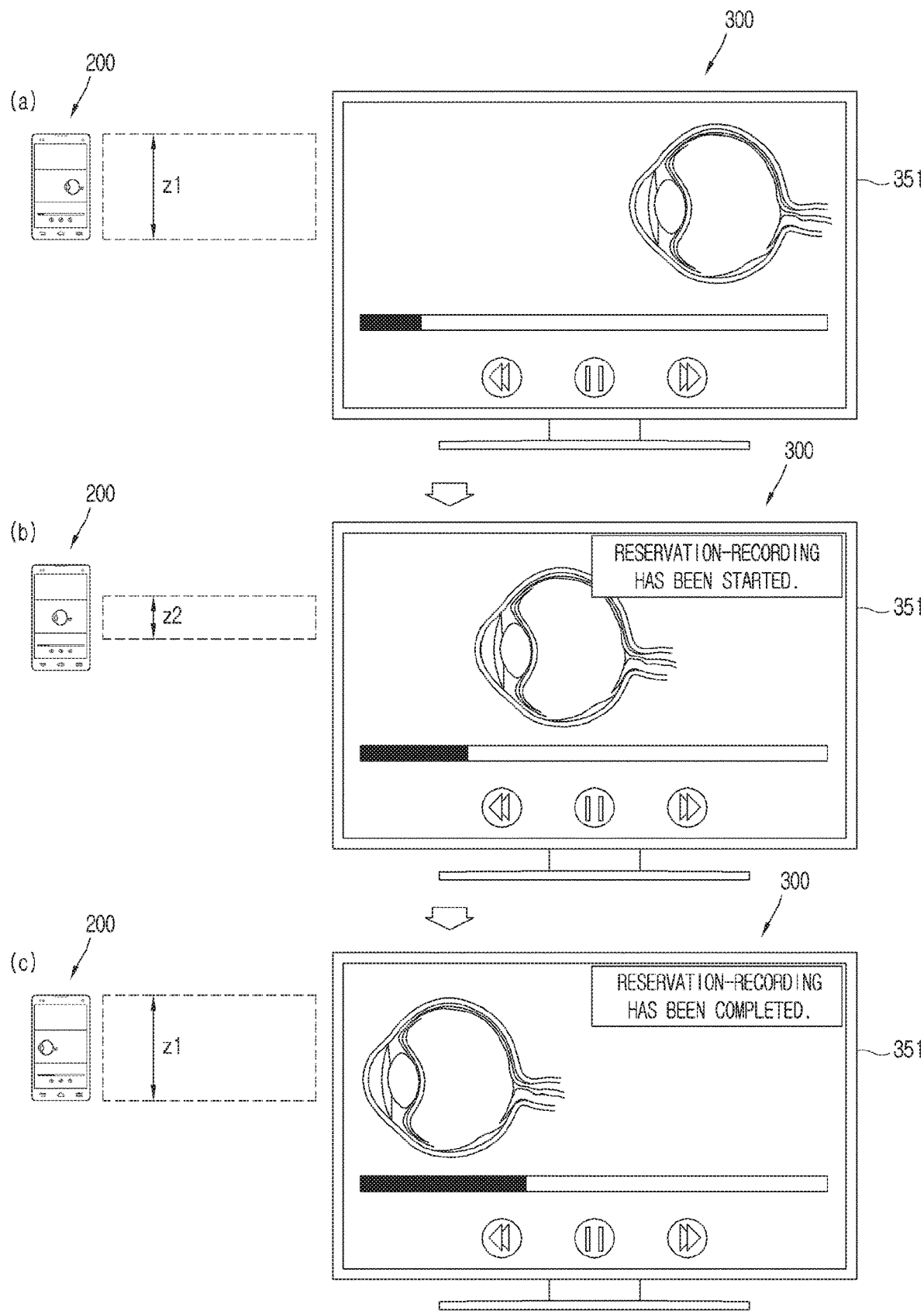
FIG. 13 is a conceptual view illustrating an embodiment related to FIG. 12.

FIG. 12 is a flowchart illustrating a method of changing a resolution of an image according to a multi-tasking state, by the sink device according to the present invention. And FIG. 13 is a conceptual view illustrating an embodiment related to FIG. 12.

The controller 380 of the sink device 300 may be operated in one of a multi-tasking state where a plurality of programs are simultaneously executed, and a single-tasking state where a program is executed. Here, the multi-tasking state means an operation state of the image display device where at least two programs are driven by a background job and/or a foreground job. And the single-tasking state means an operation state of the image display device where a program is driven by a background job and/or a foreground job. The controller 380 operated in a multi-tasking state may be converted into a single-tasking state, or the controller 380 operated in a single-tasking state may be converted into a multi-tasking state.

When operated in a multi-tasking state, the controller 380 may control an image received from the source device 200 to have a low resolution, by reducing a bandwidth of a communication path where communication with the source device 200 is executed, for efficiency of the memory.

More specifically, referring to FIG. 12, the controller 380 may receive an image from the source device (S1210). Then, the controller 380 may display the image received from the source device (S1220). In this case, the controller 380 may be in a single-tasking state where only an image display function for displaying the image received from the source device is executed.

While only the image display function is being executed in the single-tasking state, the controller 380 may sense that itself is in a multi-tasking state (S1230).

While the image display function is executed in the single-tasking state, the controller 380 may sense that a function different from the image display function is being executed. For instance, the controller 380 may sense that a reservation recording function is being executed while an image is being displayed. As another example, the controller 380 may sense that a music play function is being executed while an image is being displayed.

In this case, the controller 380 may change a channel condition of the communication path where communication with the source device 200 is executed (S1240).

When converted to a multi-tasking state from the single-tasking state, the controller 380 may reduce a bandwidth of the communication path where communication with the source device is executed, for efficiency of the memory.

For instance, as shown in FIG. 13(a), when the controller 380 is operated in a single-tasking state where only an image display function is executed, an execution state of a reservation recording function may be sensed. In this case, the controller 380 may be converted from the single-tasking state to a multi-tasking state.

When operated in the multi-tasking state, the controller 380 may reduce a bandwidth in order to change a resolution of an image. For instance, as shown in FIG. 13(b), the controller 380 may reduce a bandwidth from a first bandwidth (z1) to a second bandwidth (z2).

In this case, the source device 200 may sense the change of the bandwidth, and may transmit an image having a second resolution corresponding to the second bandwidth (z2), to the sink device 300. The second resolution corresponding to the second bandwidth (z2) may be lower than a first resolution corresponding to the first bandwidth (z1).

After the bandwidth is changed, the controller 380 may receive an image having a different resolution from the image which was being received before the bandwidth is changed (S1250). Then, the controller 380 may display the image having the different resolution (S1260).

That is, if the sink device is in a multi-tasking state, discontinuity of an image may occur when the image of a high resolution is received, due to insufficiency of the memory. In order to prevent this, the sink device may reduce a resolution of the image. Thus, the sink device of the present invention may enhance efficiency of the memory, and may enable an image to be transceived smoothly.

The controller 380 may re-change a channel condition when converted to a single-tasking state from a multi-tasking state.

For instance, as shown in FIG. 13(c), the controller 380 may change the bandwidth to the first bandwidth (z1) from the second bandwidth (z2) after the reservation recording function is terminated. As another example, the controller 380 may change the bandwidth to the first bandwidth (z1) from the second bandwidth (z2), if the music play function is terminated while the image is being displayed.

In this case, the controller 380 may receive an image having the first resolution corresponding to the first bandwidth (z1). Thus, a user may be provided with an image of a high resolution.

So far, has been explained a method of controlling a resolution according to a multi-tasking state.

Hereinafter, will be explained a method of changing a resolution according to a user input.

Figure 14:
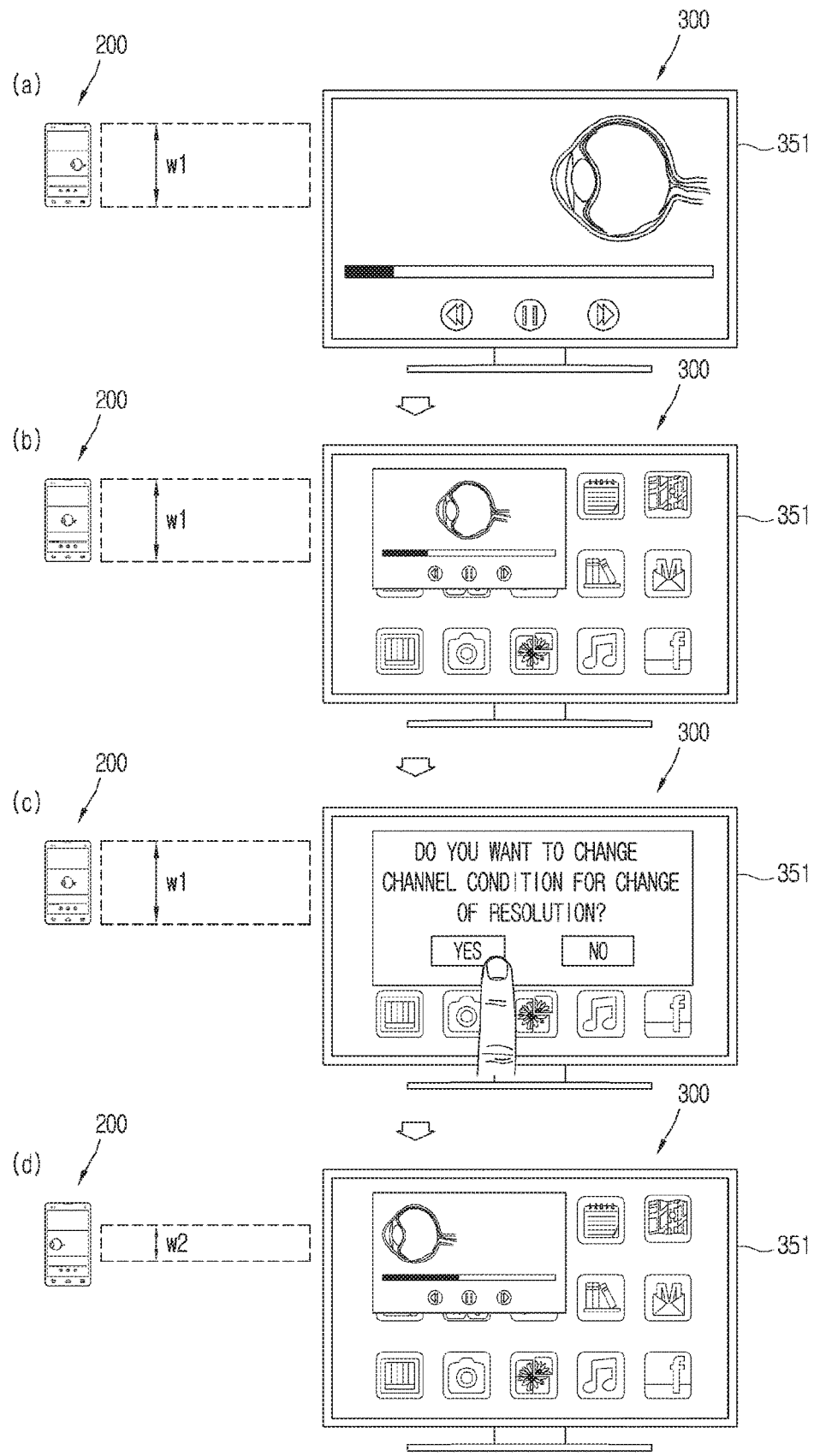
FIG. 14 is a conceptual view illustrating a method changing a resolution according to a user input, by the sink device according to the present invention.

FIG. 14 is a conceptual view illustrating a method changing a resolution according to a user input, by the sink device according to the present invention.

When a preset event occurs, the controller 380 of the sink device 300 may change a channel condition of a communication path where communication with the source device 200 is executed, thereby controlling a resolution of an image.

The controller 380 may automatically change a resolution of an image without a user input, and may change a resolution of an image based on a user input.

For instance, the controller 380 may display an image received from the source device 200. As shown in FIGS. 14(a) and 14(b), the controller 380 may sense a change of a display size of the image.

As shown in FIG. 14(c), the controller 380 may output, to the display unit 351, a pop-up window inquiring whether to execute a control operation for change of a resolution. Thus, a user may recognize a need to change a resolution, through the pop-up window. Further, a user may determine whether to execute a control operation for change of a resolution, through the pop-up window.

For instance, as shown in FIG. 14(c), when a user selects a control operation for change of a resolution, the controller 380 may change a channel condition of a communication path where communication with the source device 200 is executed, to a second bandwidth (w2) from a first bandwidth (w1). That is, in the present invention, whether to execute a control operation for change of a resolution or not may be determined according to a user input.

Thus, in the present invention, a need to change a resolution may be notified to a user, and the user may be induced to change a resolution. Further, a change of a resolution against a user's intention may be prevented.

So far, has been explained a control operation of the sink device. Hereinafter, will be explained a control operation of the source device.

Figure 15:
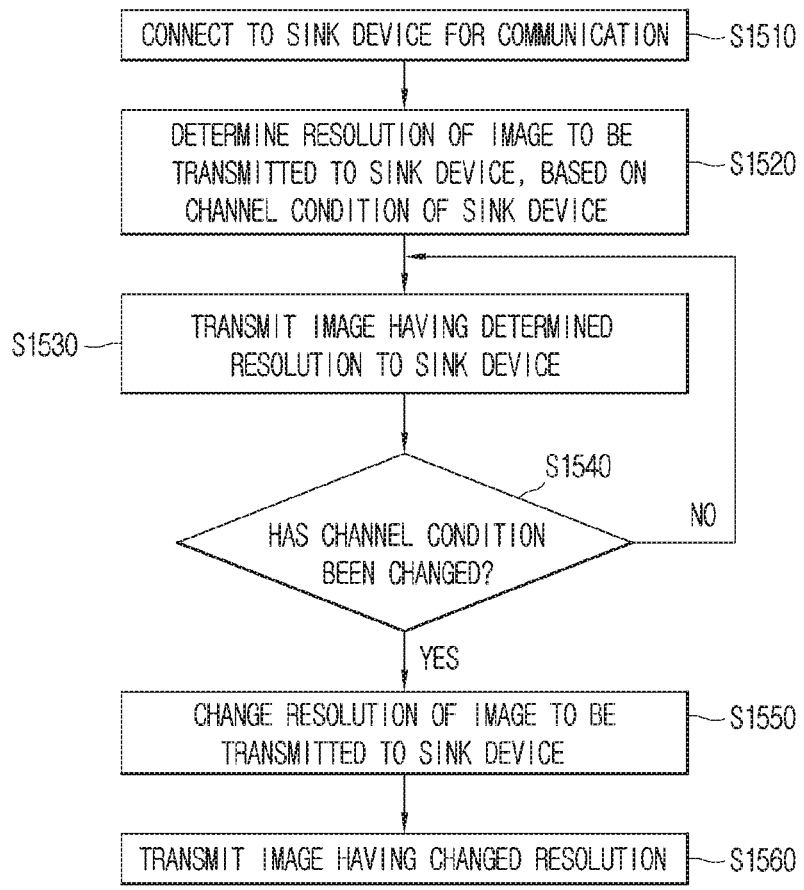
FIG. 15 is a flowchart illustrating a method of determining a resolution of an image to be transmitted to the sink device, by the source device according to the present invention.
Figure 16:
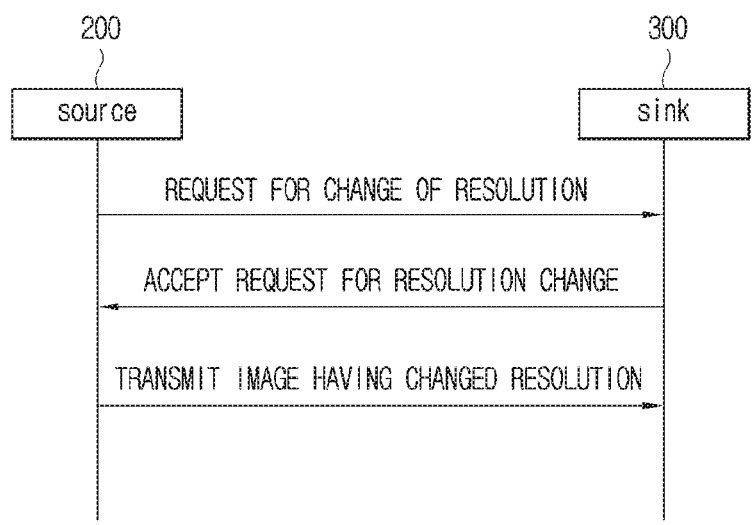
FIG. 16 is a flowchart illustrating procedures to change a resolution by the source device according to the present invention.

FIG. 15 is a flowchart illustrating a method of determining a resolution of an image to be transmitted to the sink device, by the source device according to the present invention. And FIG. 16 is a flowchart illustrating procedures to change a resolution by the source device according to the present invention.

The source device 200 may determine a resolution of an image to be transmitted to the sink device 300, based on a channel condition of a communication path where communication with the sink device is executed. And the source device 200 may change a resolution of an image to be transmitted to the sink device 300, in response to a change of a channel condition of a communication path where communication with the sink device is executed, while an image is being transmitted to the sink device 300. In this case, the source device 200 may transmit the image having the changed resolution, to the sink device 300.

More specifically, as shown in FIG. 15, the controller 280 of the source device 200 may be connected to the sink device 300 for communication (S1510). Then, the controller 280 may determine a resolution of an image to be transmitted to the sink device 300, based on a channel condition of the sink device 300 (S1520).

Once the controller 280 is connected to the sink device 300 for communication, the controller 280 may receive information about the channel condition from the sink device 300. For instance, the information about the channel condition may include information about a bandwidth, information about a transmission speed, information about an operation frequency, etc.

The controller 280 may determine a resolution of an image to be transmitted to the sink device 300, based on the information about the channel condition. For instance, the controller 280 may determine a resolution of an image as a first resolution in case of a first bandwidth, and may determine a resolution of an image as a second resolution in case of a second bandwidth.

Then, the controller 280 may transmit the image having a determined resolution to the sink device 300 (S1530). While the image having a determined resolution is being transmitted to the sink device 300, the controller 280 may sense a change of a channel condition of the sink device 300 (S1540). For instance, the controller 280 may sense a decrease of a bandwidth of a communication path where communication with the sink device 300 is executed.

Once the channel condition of the sink device 300 is changed, the controller 380 may change a resolution of an image to be transmitted to the sink device 300 (S1550).

Upon sensing of the change of the bandwidth, the controller 280 may change a resolution of an image to be transmitted to the sink device, in correspondence to the changed bandwidth.

In this case, the controller 280 may change the resolution of the image according to standards. For instance, as shown in FIG. 16, the controller 280 may transmit a resolution change request message to the sink device 300. The resolution change request message may include a parameter of wfd-av-format-change-timing.

Here, the sink device 300 may transmit, to the source device 200, one of a message which accepts the resolution change request message and a message which refuses the resolution change request message. For instance, a message having set 'wfd-video-formats' as 0 indicates a message which accepts the resolution change request message, and a message having set the 'wfd-video-formats' as 1 indicates a message which refuses the resolution change request message.

If a message which accepts the resolution change request message is received from the sink device 300, the source device 200 may transmit the image having the changed resolution to the sink device 300 (S1560).

On the other hand, if a message which refuses the resolution change request message is received from the sink device 300, the source device 200 may transmit an image having the same resolution as the image before the bandwidth is changed, to the sink device 300.

Even if a channel condition of the sink device 300 is not changed, the controller 280 may not change a resolution of an image to be transmitted to the sink device 300.

Although not shown, while an image is being transmitted to the sink device 300, the controller 280 may sense a released state of a communication connection with the sink device 300. In this case, the controller 280 may stop the transmission of the image to the sink device 300. And the controller 280 may store transmission history information about a time point when the transmission of the image to the sink device 300 has been stopped.

Then, when re-connected to the sink device 300 for communication, the controller 280 may re-transmit the image to the sink device 300 based on the transmission history information. Thus, a user may be provided with an image with continuity even in a temporary communication disconnection state.

So far, has been explained a method of changing a resolution of an image by the source device 200.

The image display device according to the present invention may have the following advantages.

Firstly, as a channel condition of the wireless communication unit is changed while an image is being received from the source device, an image having a different resolution from the image being received from the source device may be received. Thus, the image display device receives an image of a low resolution when a high resolution is not required, thereby minimizing discontinuity of images.

Secondly, the image display device may induce the source device to transmit an image having a changed resolution, even if it does not directly transmit a resolution change command to the source device.

Thirdly, if the image display device is in a multi-tasking state while an image received from the source device is being displayed, a channel condition of the wireless communication unit is changed such that the image received from the source device has a lowered resolution. With such a configuration, when the image display device is in a multi-tasking state, an unnecessary usage amount of the memory may be reduced to enhance efficiency of the memory.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet).

The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An image display device, comprising:
a wireless communication unit configured to communicate with a source device; and
a controller configured to control the wireless communication unit to receive an image transmitted from the source device,
wherein a resolution of the image transmitted from the source device is determined based on a channel condition of the wireless communication unit,
wherein the controller is further configured to:
set a bandwidth to be reduced in proportion to a decrease of a display size of the image without applying an additional control command for changing the resolution of the image transmitted from the source device based on the decreased display size of the image,
release a communication connection with the source device based on the image being reduced to a size less than a preset size when an image display function for displaying the image transmitted from the source device is executed as a foreground job,
resume communication with the source device through an additional communication link in response to determining that a size increase of the image is greater than the preset size in a released state of the communication connection, and
receive, from the source device, an initial image that was received before the communication connection was released for maintaining continuity, wherein the initial image that was received before the communication connection was released has a different resolution than the image transmitted from the source device.

2. The image display device of claim 1, further comprising a display configured to display in real-time the image transmitted from the source device,
wherein the controller is configured to control the channel condition of the wireless communication unit based on a size of the image displayed in real-time on the display, such that the image displayed in real-time on the display has a resolution corresponding to the size of the image transmitted from the source device.

3. The image display device of claim 2, wherein when the image displayed on the display has a first size, the controller is configured to control the wireless communication unit to have a first bandwidth,
wherein when the image displayed on the display has a second size larger than the first size, the controller is configured to control the wireless communication unit to have a second bandwidth greater than the first bandwidth.

4. The image display device of claim 2, wherein when the size of the image displayed in real-time on the display is increased to a value more than the preset size, the controller is configured to receive the image transmitted from the source device again before a communication connection is released.

5. The image display device of claim 1, wherein when the image display function for displaying the image transmitted from the source device is executed as a foreground job, the controller is configured to control the wireless communication unit to have a first channel condition,
wherein when the image display function is executed as a background job, the controller is configured to control the wireless communication unit to have a second channel condition different from the first channel condition.

6. The image display device of claim 5, wherein the controller is configured to transmit the image transmitted from the source device at a first resolution when the image display function is executed as a background job, and the controller is configured to transmit the image transmitted from the source device at a second resolution when the image display function is executed as a foreground job, wherein the first resolution is lower than the second resolution.

7. The image display device of claim 1, wherein if the image display device being operated in a single-tasking state is converted to a multi-tasking state, the controller is configured to control the channel condition of the wireless communication unit such that an image to be received in the multi-tasking state has a lower resolution than an image to be received in the single-tasking state.

8. The image display device of claim 7, wherein if the image display device being operated in a multi-tasking state is converted to a single-tasking state, the controller is configured to control the channel condition of the wireless communication unit such that an image to be received in the single-tasking state has a higher resolution than an image to be received in the multi-tasking state.

9. The image display device of claim 1, wherein the controller is configured to change a modulation type and a coding rate of the wireless communication unit such that the channel condition of the wireless communication unit is changed.

10. The image display device of claim 1, wherein when the channel condition of the wireless communication unit is changed, the controller is configured to receive an additional image having a different resolution from the image received from the source device before the channel condition of the wireless communication unit is changed.

11. The image display device of claim 1, wherein the controller is configured to output notification information indicating a need to change the channel condition of the wireless communication unit before controlling the channel condition of the wireless communication unit.

12. The image display device of claim 11, wherein the controller is configured to control the channel condition of the wireless communication unit based on a control command with respect to the outputted notification information.

13. A method of controlling an image display device, comprising:
communicating with a source device;
receiving an image transmitted from the source device, by a wireless communication unit, wherein a resolution of the image transmitted from the source device is determined based on a channel condition of the wireless communication unit;
setting a bandwidth to be reduced in proportion to a decrease of a display size of the image without applying an additional control command for changing the resolution of the image transmitted from the source device based on the decreased display size of the image;

releasing a communication connection with the source device based on the image received from the source device being reduced to a size less than a preset size when an image display function for displaying the image transmitted from the source device is executed as a foreground job;

resuming communication with the source device through an additional communication link in response to determining that a size increase of the image is greater than the preset size in a released state of the communication connection, and receiving, from the source device, an initial image that was received before the communication connection was released for maintaining continuity, wherein the initial image that was received before the communication connection was released has a different resolution than the image transmitted from the source device.

14. The method of claim 13, further comprising sensing a bandwidth of a communication path where communication with the source device is executed,
   wherein in the receiving the image, when the bandwidth of the communication path is changed, an image having a resolution different from a specific resolution is received.

15. The method of claim 13, wherein in the receiving the image, when a preset event occurs, the channel condition of the wireless communication unit is controlled such that the image transmitted from the source device has a specific resolution.

16. The method of claim 13, further comprising: outputting notification information indicating a need to change the channel of the wireless communication unit before controlling the channel condition of the wireless communication unit.

* * * * *